Feb. 7, 1956 C. B. WENNER 2,733,956
VAPORIZING DISPENSER FOR AIR TREATING GELS
Filed March 18, 1955
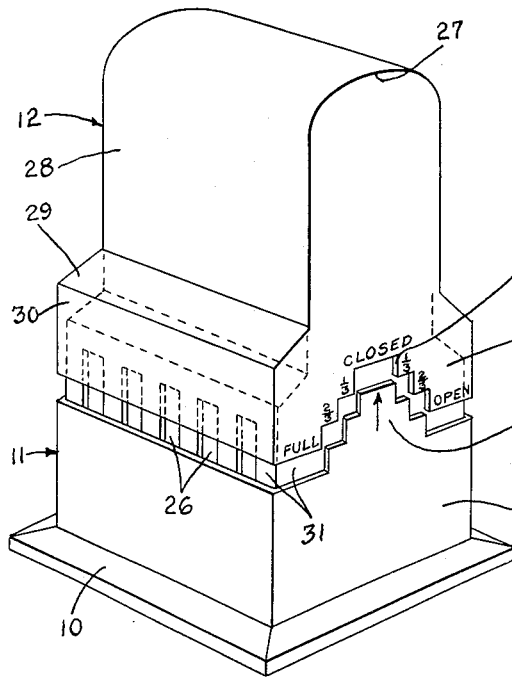
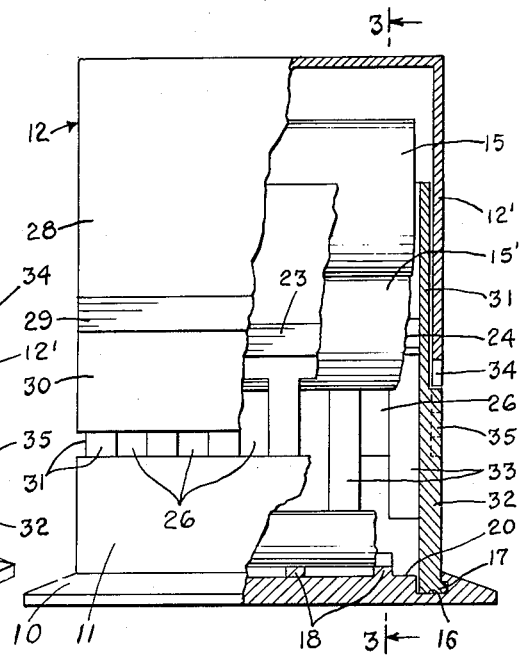
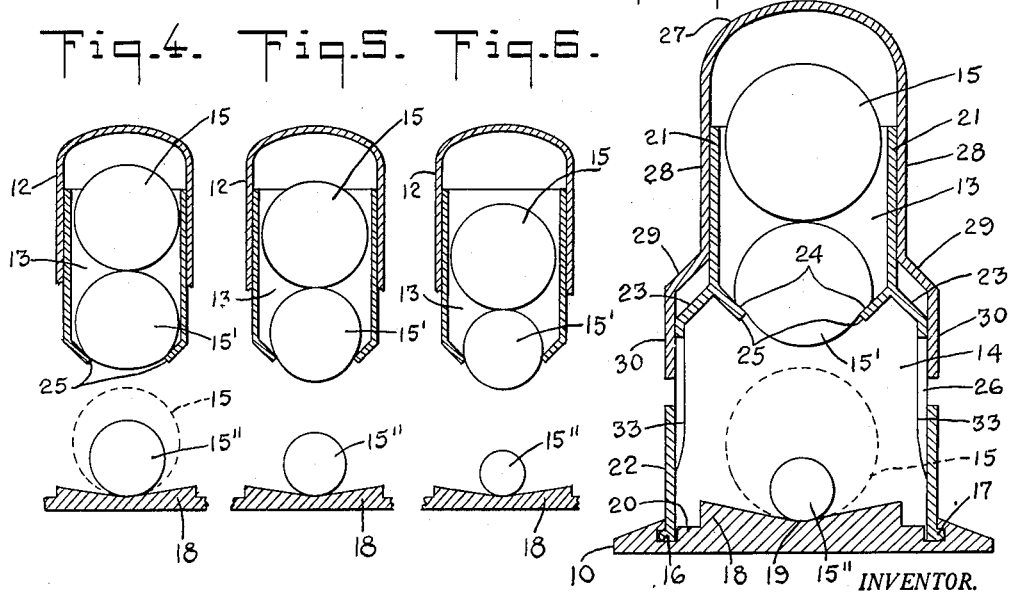
INVENTOR.
CHARLES B. WENNER
BY
Howard E. Thompson Jr
ATTORNEY.

United States Patent Office 2,733,956
Patented Feb. 7, 1956

2,733,956

VAPORIZING DISPENSER FOR AIR TREATING GELS

Charles B. Wenner, Darien, Conn., assignor to Airkem, Inc., New York, N. Y., a corporation of New York Application March 18, 1955, Serial No. 495,220

10 Claims. (Cl. 299—24)

This invention relates to a vaporizing dispenser for air treating gels having a vaporizing zone, a storage zone for bodies of air treating gel, and means intermediate the two zones for controlling the delivery of bodies of air treating gel to said vaporizing zone. More particularly the invention relates to a vapor diffuser of the class described for use with cylindrical bodies of air treating gel in which a plurality of cylindrical bodies arranged in horizontal position and having essentially linear contact therebetween are arranged in a storage zone which is substantially sealed from circulating air by engagement between the lowermost of said cylindrical bodies and a restricted discharge opening into a vaporizing zone. Still more particularly the invention relates to a vapor diffuser of the class described wherein the restricted discharge between the storage zone and vaporizing zone bears such a relationship to the original diameter of the cylindrical gel bodies as to allow substantially complete evaporation of each gel body in the vaporizing zone before the next successive cylindrical body is delivered thereto from the storage zone.

Air treating gels of the type disclosed in United States Patent No. 2,691,615 wherein an aqueous medium containing 1 to 10% of a mixture of volatile air treating components is solidified by means of a small amount i. e. 1 to 4% of an aqueous gelling agent provide a very effective means for introducing into air a uniform quality vapor mixture for effecting deodorization and other treatments of the air which involve the introduction of volatilizable components thereto. It has been found, however, that when adapting such gels to uses in which continued functioning for extended periods i. e. a month or more before a starting quantity or charge of gel is expended there is distinct advantage in employing a certain quantity of gel in the form of a plurality of smaller bodies rather than a single large body. One reason for this is that with a single large body of gel it is possible, particularly with extended high rate evaporation for the outer surface of gel to become hard and dry before all of the volatilizable materials from within the gel have diffused to the surface for evaporation. While this is not so readily encountered in instances when the gel is subjected to intermittent uses of short duration, it will be evident that a product intended for use in the treatment of air should, if possible, function equally well under all conditions of use, whether intermittent or continuous, slow or rapid.

When employing a plurality of smaller bodies of gel, the full advantage in inherent use of smaller bodies is realized only if successful gel bodies are delivered individually to an evaporation zone as and when needed as indicated by the falling off of volatilization from the body or bodies of gel previously delivered to such zone. The new vapor diffuser in accordance with the present invention provides in a very efficient way for the automatic individual delivery of gel bodies to a reaction zone as needed and operates equally well whether the device is in use continuously, or intermittently, or is adjusted for slow or rapid volatilization therefrom. At the same time the device is attractive in appearance, simple in construction, and readily adapted for inexpensive production, as for example by molding from plastic materials.

Novel features of the invention will readily be apparent from a consideration of the following description taken together with the accompanying drawing in which preferred embodiments of the invention have been shown with the various parts thereof identified by suitable reference characters in each of the views and in which:

Fig. 1 is a perspective view of the device adjusted to a partially open position;

Fig. 2 is a front elevation view of the device as shown in Fig. 1 with part of the structure broken away and in section;

Fig. 3 is a sectional view substantially on the line 3—3 as seen in Fig. 2; and

Figs. 4, 5 and 6 are partial views similar to Fig. 3 showing different stages of operation of the device.

As shown in Figs. 1 to 3 of the drawing the vapor diffuser comprises a base 10, a body portion 11 and a telescoping lid or closure part 12. These three interfitting parts together form an upper storage chamber 13 and a lower volatilization chamber 14 for cylindrical bodies of air treating gel 15. The base 10 which may be fashioned from a flexible or rubber-like plastic is provided in closely spaced relation to its peripheral edges with an undercut groove 16 for receiving in snap or frictional engagement an outwardly extending bead or flange 17 which extends around the periphery of the lower end of the body part 11. At longitudinally spaced intervals the base 10 is provided with slightly elevated saddles 18 extending transversely of the base and having depressed central portions as seen at 19 in Fig. 3. The saddles 18 serve the dual function of centering a gel body 15 within the volatilization chamber 14 and elevating the gel body slightly above the surface 20 of the base.

The body part 11 in its transverse cross-section as seen in Fig. 3 has an upper portion 21 which is of a width to receive closely but freely cylindrical gel bodies 15 of a predetermined diameter, and a lower portion 22 which is of greater width than the upper portion 21 and joining the upper portion 21 in a tapered wall or ledge 23. In substantial alignment with the tapered walls or ledges 23 and extending inwardly and downwardly of the device are narrow ribs or vanes 24 forming a restricted passage 25 between the storage chamber 13 and volatilizing chamber 14.

The restricted passage 25 serves the dual purpose of essentially sealing the storage chamber 13 from the volatilizing chamber 14 by establishing lines of contact between the lowermost gel body 15 and the ribs 24. The particularly width of the opening 25 or spacing between the free ends of the ribs 24 is preferably about 75% of the starting diameter of the gel body 15 and as more fully hereinafter described in discussing Figs. 4 to 6 of the drawing it is the size of the discharge opening 25 which makes possible the unique effectiveness of the device.

The further control of the device to prevent, permit and regulate volatilization of material from the chamber 14 is provided by vertical adjustment of the lid 12 with respect to apertures 26 in opposed longitudinal walls of the lower portion 22 in the body part 11. It will be noted that the lid or closure 12 has a closed top 27 which is suitably of a domed contour, upper longitudinal walls 28 spaced to closely engage the upper portion 21 of the body part, beveled ledges 29 conforming to the ledges 23 of the body part and lower longitudinal walls 30 adapted to over-lie the apertures 26 and suitably engaging inwardly offset or recessed surfaces 31 in the lower portion 22 of the body part. These inwardly offset or recessed surfaces 31 preferably continue on transverse end walls 32 of the body part 11 as will be apparent from a consideration of Figs. 1 and 2 of the drawing.

In fashioning the body part 11 and the apertures 26 and inwardly offset walls 31 it will be noted that by extending the inwardly offset wall portions 31 which border the apertures 26 below such apertures as the ribs 33, seen in Figs. 2 and 3, it is possible to form all parts of the body 11 in a single molding or casting operation between linearly interfitting molds.

The vertical adjustment of the lid or closure 12 for adjusting the extent of opening of the apertures 26 and thus regulating the rate of volatilization of material from the device can be facilitated by suitable positioning or aligning means such as the visual indicator in Fig. 1 of the drawing. This visual indicator which for purpose of illustration has been shown as providing normal positions of closed, one-third open, two-thirds open and fully open comprises a stepped cutout 34 in one end 12' of the closure or lid 12 and an interfitting stepped portion 35 protruding from the inwardly offset portion 31 of end wall 32 of said body part. In Fig. 1 of the drawing the control indicates a setting at which the apertures 26 are one-third open and it will be apparent that other desired adjustments can readily be obtained by suitably aligning the stepped portions of the recess or cutout 34 and protrusion 35.

In the device as shown in the drawing the storage chamber 13 accommodates two bodies 15 of gel and the volatilizing chamber 14 can initially accommodate one body of gel as shown in the dotted line position in Figs. 3 and 4 of the drawing. Thus the device could initially be so distributed as a package unit loaded with three bodies or slugs of gel 15. It will be understood in this connection that by merely extending the upper portion of the device the storage chamber 13 could be made to accommodate more than two gel bodies 15 and consistent with the rate at which gel is to be consumed such vertical extension of the device might be desired. The device as shown in the drawing, however, represents a practical size for normal home use with a deodorizing gel which would provide a month or more of normal intermittent service before recharging with gel is necessary.

As air treating gels of the type disclosed in United States Patent No. 2,691,615 evaporate on exposure to air, liquid medium is continuously diffused from within the gel to the surface of the gel causing a gradual shrinkage in the size and shape of the gel. If a mass of gel is substantially completely exposed to the air as in the case of the dotted line showings in Figs. 3 and 4, the rate of evaporation will be greater, due to the larger surface area exposed, than will the rate of evaporation from a portion of gel exposed as through the restricted discharge opening 25. Thus the body of gel in the volatilizing chamber 14 will be consumed at a much more rapid rate than the body exposed through the opening 25 until a substantial amount of shrinkage has taken place in the lower gel body. As the portion of gel exposed through the opening 25 becomes a greater proportion of the total gel surfaces exposed within the volatilizing chamber 14, shrinkage of the gel body 15' partially exposed at the opening 25 will accelerate eventually to the point where the exposed gel body 15' can pass through the opening 25, thus permitting a fresh body of gel 15 to become exposed at the opening 25.

Figs. 4, 5 and 6 are intended to show typical different stages in the consumption of gel. In Fig. 4 the three gel bodies including the dotted line showing 15 is representative of the starting situation with three fresh bodies of gel. The smaller gel body 15" indicates the situation immediately after a gel slug 15' has dropped through the opening 25 and also represents substantially the amount of shrinkage in the gel body as shown in dotted lines that would be required before appreciable evaporation from the gel body 15' as shown in Fig. 4 would take place.

Fig. 5 is illustrative of an intermediate stage when the lower gel body 15" has shrunk to a considerable extent and evaporation and shrinkage of the exposed gel body 15' has become quite advanced. In Fig. 6 of the drawing the lower gel body 15" has shrunk to the point of being substantially spent and the exposed gel body 15' has evaporated and shrunk substantially to the point where it will pass through the opening 25. It will be noted in this connection that because of the substantial seal effected between the exposed gel body 15' and sides of the passage 25 there is no appreciable circulation of air in the chamber 13 and upper bodies of gel 15 thus remain fresh and unchanged until exposed by dropping of the gel body 15'.

As previously mentioned, the relationship between the size or width of the opening 25 and the initial diameter of the gel slug 15 is an important factor in synchronizing the dropping of gel slugs 15' and the consumption of previously dropped gel slugs 15". It has been found that a ratio of about 3 to 4 between the width of opening 25 and diameter of gel slug 15 is suitable for this control. Thus with a gel body one-and-a-half inches in diameter, the width of opening 25 should be approximately one-and-one-eighth inches.

It is not essential that the gel slug 15" be completely spent before the exposed slug 15' is dropped. In fact the substantially spent slug 15" may continue to give off vapors for a considerable period of time and in practice several spent slugs 15" may be permitted to accumulate in the volatilizing chamber 14. In removing the spent slugs the bottom 10 of the device is forcibly removed from the body portion 11 giving access to the volatilizing chamber 14.

While the external structure of the device has been described in considerable detail, as well as the internal structure thereof, it is to be understood that in various adaptations of the invention much of the external detail could be modified or eliminated, and that in its broader aspects the invention comprises the combination as shown in Figs. 4, 5 and 6 of a volatilizing zone, a storage zone, or chamber separated from the volatilizing zone by a restricted passage which is substantially sealed by a partially exposed cylindrical gel body, said gel body progressively shrinking as volatile materials therefrom escape through its exposed portion until it drops through said opening.

It is to be understood that the particular size and shape of the openings 26 as shown in the drawing is purely illustrative and that the size and shape of these openings will be determined in particular instances by the evaporation characteristics of the material to be dispensed from the device. By way of illustration the openings 26 might be somewhat narrower and extended further down on the base part of the device. Such variation would have the effect of providing greater circulation of air in the lower portion of the volatilizing chamber 14 and would also provide for greater movement of the closure or cap member between the fully closed and fully open position in controlling circulation of air through the side openings. This greater movement in control would provide a corresponding increase in the degree of variation which the user could make in the rate of circulation of air through the device and emission of air treating vapors therefrom.

Various changes and modifications in the device as herein disclosed will occur to those skilled in the art and to the extent that such changes and modifications are embraced by the appended claims, it is to be understood that they constitute part of my invention.

I claim:

1. A vapor diffusing device for air treating gel in cylindrical slug form, said device comprising a storage chamber having a length and width closely conforming to the length and diameter of a predetermined sized cylindrical gel slug when disposed with its axis horizontally of said chamber, supporting means for said chamber providing a volatilization zone below said chamber, and means at the base of said chamber forming a restricted passage between the volatilization zone and said chamber, the opening provided by said restricted passage being substantially less than the diameter of a fresh gel slug to thereby support the gel slug within said chamber while exposing a portion of the cylindrical surface of said gel slug for evaporation of volatilizable material therefrom.

2. A vapor diffusing device as defined in claim 1 wherein said restricted passage is formed by inwardly and downwardly extending vanes providing engagement with a cylindrical gel slug along lines extending longitudinally thereof.

3. A vapor diffusing device as defined in claim 1 wherein the ratio between the width of said passage and diameter of said cylindrical gel slug is approximately a 3 to 4 ratio.

4. A vapor diffusing device as defined in claim 1 wherein side walls of the volatilizing zone and storage chamber constitute portions of a unitary body part having frictional snap engagement with a detachable bottom part and telescoping sliding engagement with a top closure part.

5. A vapor diffusing device as defined in claim 4 wherein lower edges of said telescoping closure part register with and control apertures in opposed walls of said volatilizing zone.

6. A vapor diffusing device as defined in claim 4 wherein lower edges of said telescoping closure part register with and control apertures in opposed walls of said volatilizing zone, and cooperating means on said closure part and body part facilitate adjustment of said closure part with respect to said apertures.

7. A vapor diffusing device comprising a rectangular base, a body part open at both ends and having means at one end thereof for snap engagement with said base part, a closure member having telescopic engagement with said body part for closing the opposed end thereof, inwardly extending means internally of said body part dividing same into an upper storage chamber for cylindrical bodies of air treating gel, and a lower volatilizing chamber for such gel bodies, opposed side walls of said volatilizing chamber having apertures adapted to be opened and closed in the sliding movement of said closure member, said dividing means providing for the support of a cylindrical gel body with an elongated panel thereof exposed for evaporation until shrinkage due to evaporation of the gel body permits the passage of the gel body through said dividing means.

8. A vapor diffusing device as defined in claim 7 wherein outer surfaces of the body part are inwardly offset to permit outer surfaces of said closure part to be substantially flush with outer surfaces of the remainder of said body part.

9. A vapor diffusing device as defined in claim 8 wherein the inwardly offset portions of said body part adjacent the apertures therein continue as ribs below said apertures.

10. A vapor diffusing device as defined in claim 7 wherein the apertured portions of said volatilizing chamber are disposed outwardly beyond the point of alignment with corresponding walls of said storage chamber, thereby facilitating the circulation of air throughout said volatilizing chamber.

References Cited in the file of this patent

UNITED STATES PATENTS

| | | |
|---|---|---|
| 1,105,502 | Fain | July 18, 1914 |
| 1,846,068 | Sandehn | Feb. 23, 1932 |
| 2,132,602 | Belshaw | Oct. 11, 1938 |